United States Patent Office 3,544,331
Patented Dec. 1, 1970

3,544,331
SEPARATE GRINDING OF VARIOUS COFFEE TYPES TO CONTROL FLAVOR CONTRIBUTION
Eddy R. Hair, Colerain Township, Hamilton County, Ohio, assignor to The Procter & Gamble Company, Cincinnati, Ohio, a corporation of Ohio
No Drawing. Filed Mar. 4, 1968, Ser. No. 709,872
Int. Cl. A23f 1/00
U.S. Cl. 99—68                        3 Claims

ABSTRACT OF THE DISCLOSURE

A process for obtaining a roast and ground coffee product comprising (1) separately grinding to a fine particle size roast coffee beans that provide a taste contribution to a roast and ground coffee product that it is desired to increase, (2) separately grinding to a coarse particle size roast coffee beans that provide a taste contribution to a roast and ground coffee product that it is desired to decrease, and (3) mixing the resulting roast and ground coffee fractions to obtain a novel roast and ground coffee product.

BACKGROUND OF THE INVENTION

The field of this invention is roast and ground coffee. One object in processing any food product is to bring out the best flavor possible with the raw materials used, and such a flavor objective is the primary consideration in processes involved in the preparation of roast and ground coffee product.

Roast and ground coffee products may be formed from a single variety of coffee beans, but such roast and ground coffee products do not generally give a coffee brew with a taste that most consumers fined desirable. The roast and ground coffee products that the majority of coffee drinkers find give an acceptable and desirable tasting coffee brew consist of blends formed from a variety of coffee beans. In forming what are considered to be the most acceptable roast and ground coffee products, therefore, coffee beans of different growth areas, botanical origin, and quality are generally blended together.

There are three major types of coffee beans which can be blended to form a roast and ground coffee product. There are Brazilians and milds, which botanically are Arabicas, and Robustas. Coffee brews prepared from the Brazilian beans are relatively non-aromatic and neutral-flavored in the cup while the high grown mild coffees are very fragrant and acidy, often with heavy body in the cup. Robustas have strong distinctive flavors characteristics; they are bitter and contain varying degrees of a rubbery flavor note.

Although there are three major coffee taste types (Brazilians, milds, and Robustas), each of these various types of coffee beans will yield different taste properties depending on the soil and weather conditions in the growth area, curing methods, and other factors. According to their growth conditions and their preparation for market, some of the coffee beans will have flavor characteristics noted for strength, some for rich flavor or "body," and others for acidity and aroma.

Most roast and ground coffee products are prepared from blends of coffee beans containing each of the above-mentioned three major coffee tests types. Since neutral-tasting Brazilian coffee beans are generally the lowest priced acceptable coffees in large supply, they make a good base for blending flavor, and large amounts of these coffees are often used in blends to control the cost of the roast and ground product. Robustas, with their strong distinctive flavor characteristics, are traditionally the lowest priced coffee beans, and their content in a blend can strongly influence both the cost and taste of a coffee blend. While many coffee blends utilize at least some Robustas to contribute desirable flavor notes, the level of Robusta usage generally must be very limited because of the Robusta's exceptionally strong characteristic flavor. Variations in the level of usage of Brazilians and milds in a blend, however, can be made with relatively greater freedom without disturbing the taste of the roast and ground coffee product.

Typically, established coffee processors have formulated a roast and ground coffee blend which gives a flavorful coffee brew that satisfies consumers' taste. These consumers, however, can be retained and satisfied only by consistently forming a roast and ground coffee blend which gives coffee brews that consistently present the particular taste quality that consumers find desirable.

Maintaining this product flavor uniformity in a roast and ground coffee product, however, can be a difficult task because it is virtually impossible to form consistently identical blends of roast and ground coffee. This is so for several reasons. First, the quality of various varieties of coffee beans useful in preparing a roast and ground coffee blend can vary considerably. Secondly, the price of one or more coffee bean varieties useful in preparing the roast and ground coffee blend can change such that it can be desirable to either increase or decrease the level at which particular coffee bean varieties are employed in the blend. Thirdly, the availability of one or more coffee bean varieties useful in preparing the roast and ground coffee can be limited, even though the price and quality of the beans involved are satisfactory.

A notable problem in roast and ground coffee processing, therefore, is to consistently produce a roast and ground coffee product which will consistently give an acceptably uniform brew taste even if the composition of the roast and ground coffee blend must change from time to time.

In spite of the above-mentioned difficulties, roast and ground coffee products can usually be prepared which give coffee brews that generally present, within acceptable limits, the typical taste quality with which a particular roast and ground coffee is associated. This result is accomplished by skillful coffee processing, e.g., roasting green coffee beans to a degree such that particular taste qualities are developed, and skillful blending of coffee beans.

Generally roast and ground coffee products are formed, as is taught in the prior art, by (1) blending together various types of green coffee beans, (2) roasting the blend of green coffee beans, and (3) grinding the resulting blend of roast beans. One variation of this process taught in the prior art is to roast various types of green coffee beans separately, then blend the roast coffee beans together, and grind the resulting blend of roast coffee beans to form a roast and ground coffee product. (See, Sivetz and Foote, Coffee Processing Technology, vol. 1, page 173, The Avi Publishing Co., 1963.)

It would be desirable to be able to formulate blends of roast and ground coffees with greater latitude than that permitted by prior art processes without changing the taste characteristics of coffee brews prepared therefrom.

SUMMARY OF THE INVENTION

This invention relates to a novel process whereby substitutions of coffee beans which present different taste characteristics can be made with greater freedom in a roast and ground coffee product comprising a blend of coffee beans without affecting the taste characteristics of the coffee brew prepared therefrom; the invention also presents novel products based on this concept.

Broadly, the novel process comprises (1) separately grinding to a fine particle size a fraction of roast coffee beans that provide a taste contribution to a roast and ground coffee product that it is desired to increase, (2) separately grinding to a coarse particle size a different fraction of roast coffee beans that provide a taste contribution to a roast and ground coffee product that it is desired to decrease, and (3) mixing the resulting roast and ground coffee fractions to obtain a novel roast and ground coffee product. The novel roast and ground coffee product obtained by this process is unique in that particular coffee bean varieties appear in a predominately fine particle size and other coffee bean varieties appear in a predominately coarse particle size.

It has been found that the flavor contribution to a coffee brew of roast coffee beans in such a novel roast and ground coffee product is increased by grinding coffee beans to a fine particle size. Surprisingly, it has been found, that within the limits of tasting ability, that in such a blend of roast and ground coffee the flavor notes contributed by roast coffee beans ground to a fine particle size are not only stronger in intensity, but are substantially identical to flavor notes contributed by the same roast coffee beans more coarsely ground. Conversely, it has been found, that within the limits of tasting ability, that the particular flavor contribution to a coffee brew of distinct types of roast coffee beans in a roast and ground coffee product is decreased by grinding roast coffee beans to a coarse particle size.

In effect it has been found that the effective flavor contribution of distinct types of roast and ground coffee beans in a roast and ground coffee product formed from a blend of various types of coffee beans can be increased or decreased to some extent by varying the particle size of the various types of roast coffee beans.

DISCUSSION OF THE INVENTION AND ITS PREFERRED EMBODIMENTS

This invention relates to a roast and ground coffee product comprising a blend of various types of roast coffee beans.

The invention presents a new process for obtaining a roast and ground coffee product comprising a blend of various types of coffee beans. This new process involves separately grinding to different particle sizes various varieties of roast coffee beans, and mixing the resulting fractions to obtain a novel roast and ground coffee product.

This process for obtaining a roast and ground coffee product formed from a blend of various types of coffee beans is advantageous because the flavor contribution to a coffee brew of distinct types of coffee beans in such a roast and ground coffee product can be increased by grinding these particular types of coffee beans to a fine particle size. Surprisingly, it has been found, that within the limits of tasting ability, that in a blend of roast and ground coffee beans the flavor notes contributed by the roast coffee beans ground to a fine particle size are not only stronger in intensity, but are substantially identical to the flavor notes contributed by the same coffee beans more coarsely ground. Conversely, it has also been found, that within the limits of tasting ability, that the particular flavor contribution to a coffee brew of distinct types of roast coffee beans in a roast and ground coffee product can be decreased in intensity by grinding such roast coffee beans to a coarse particle size.

It is, of course, well known in the coffee art that coffee solubles and volatiles, which are the coffee flavor and aroma in a coffee brew, can be more thoroughly extracted to give a higher yield of solubles by breaking down roast coffee beans into smaller pieces and that this more thorough extraction yields stronger tasting coffee brews.

Grinding roast coffee beans to a fine particle size breaks down roast coffee beans into many small pieces, and correspondingly increases the surface exposure of the roast coffee beans. To the extent that roast coffee beans are ground to finer particle sizes, more small particles result and surface exposure is correspondingly increased allowing for more thorough extraction of the roast and ground coffee beans. It is known in the coffee art, however, that this greater surface exposure increases the amount of certain colloidal substances that are free to go into water solution or suspension in a coffee brew, and that most of these substances are high molecular weight carbohydrates and fatty compounds. Thus the prior art notes that grinding roast coffee beans to a fine particle size not only increases extraction efficiency and the yield of the above-mentioned coffee solubles, but also increases the yield of colloidal substances, thereby changing both the nature and the flavor of coffee brews prepared from coffee beans ground to a fine particle size. (See, Sivetz and Foote, supra, page 239.)

It has now been found, however, that if distinct types of roast coffee beans in a roast and ground coffee product are ground to a fine particle size that the intensity of the flavor contribution to a coffee brew of that portion of the roast coffee beans is increased and, within the limits of tasting ability, is substantially identical to the same coffee beans ground to a coarse particle size.

In the practice of the process of this invention it is essential that more than one variety of roast coffee beans presenting distinct taste characteristics be used, and that the novel roast and ground coffee product be prepared from a blend of various types of roast coffee beans. If a single variety of coffee beans were used, grinding a portion of the coffee beans to a fine particle size and grinding another portion to a coarser particle size would be essentially equivalent to grinding all of the coffee beans in the product to some intermediate particle size in that a roast and ground coffee product presenting the same taste characteristics could be prepared by merely grinding all of the roast coffee beans to an appropriate intermediate particle size.

In addition, in order to prepare a roast and ground coffee product according to this invention, it is essential that various particular types of roast coffee beans be separately ground to appropriate particle sizes before finally blending the various coffee taste types. The advantages of this invention are realized only by grinding distinct varieties of coffee beans which present different taste characteristics to predominately different particle sizes.

In this regard, since the various varieties of coffee beans must be separately ground, it is preferable that green coffee beans used in the practice of this invention also be separately roasted. This procedure is preferred because green coffee beans are generally packaged according to type and quality, and this segregation should be preserved to the extent that separate grinding of particular coffee bean types will not require reclassifying roast coffee beans. Also, separate roasting allows the optimum roast for each variety of beans. Of course, in a roast and ground coffee product composed of a blend of several varieties of coffee beans, it may be desired to grind two or more of the coffee bean varieties to the same particle size in which case these particular varieties of coffee beans need not be roasted or ground separately. In the practice of this invention, it is only necessary that some particular variety of coffee beans to be ground to a predominately different particle size than other varieties of coffee beans in the roast and ground coffee product.

In its broadest aspect this invention teaches obtaining a novel roast and ground coffee product by a process comprising (1) separately grinding to a fine particle size a fraction of roast coffee beans that provide a taste contribution to a roast and ground coffee product that it is desired to increase, (2) separately grinding to a coarse particle size a different fraction of roast coffee beans that provide a taste contribution to a roast and ground coffee product that it is desired to decrease, and (3) mixing the resulting roast and ground coffee fractions.

In practice the roast and ground coffee products of this invention can be a mixture of roast coffees of very fine and very coarse particle sizes. While such products are within the scope of this invention, they can present an appearance which is unusual to the consumer. In addition, such products can have brewing characteristics different from those within the ordinary experience of the consumer. While such products are useful and within the scope of this invention it is possible that such products will not appeal to the consumer.

In a narrower and preferred aspect of this invention, a roast and ground coffee product is obtained according to the process of this invention whereby the roast and ground coffee product presents the overall size distribution, and thus the appearance and brewing characteristics of ordinary commercial roast and ground coffee products.

In ordinary commercial roast and ground coffee products, roast coffee beans are blended and ground into a variety of grinds. Among consumers, the most popular of these grinds are characterized as "Regular" and "Drip." A typical "Regular" grind roast and ground coffee product shows a sieve analysis on U.S. Standard Screens as follows:

| | Percent |
|---|---|
| On 12 | 0–7 |
| On 16 | 15–30 |
| On 20 | 25–50 |
| On 30 | 10–30 |
| On Pan | 8–25 |

A typical "Drip" grind roast and ground coffee product shows a sieve analysis on U.S. Standard Screens as follows:

| | Percent |
|---|---|
| On 12 | 0–1 |
| On 16 | 4–10 |
| On 20 | 30–45 |
| On 30 | 25–40 |
| On Pan | 15–25 |

(Explanations of various roast coffee bean grinds, and processes for grinding coffee beans can be found in Sivetz and Foote, supra, pages 239–50.)

In a preferred aspect of this invention, the above-mentioned novel process is conducted such that when roast coffee beans ground to a fine particle size are mixed with roast coffee beans ground to a coarse particle size the result is a product which gives a sieve analysis similar to recognized roast and ground coffee product grinds such as "Regular" and "Drip." These novel products have the appearance of the recognized grinds, can carry the label of such grinds, e.g., "Regular," and can be used as such grinds are ordinarily used.

A "Regular" grind roast and ground coffee product of this invention can be prepared, for example, in the following manner. A portion of particular coffee beans is ground to a predominately course particle size, and a portion of other coffee beans is ground to a predominately fine particle size, such that each portion has the following particle size distribution.

| | On 12 | On 16 | On 20 | On 30 | On Pan |
|---|---|---|---|---|---|
| Coarse portion, percent | 0–14 | 44–49 | 22–28 | 6–10 | 6–10 |
| Fine portion, percent | 0 | 0–1 | 36–42 | 36–40 | 20–24 |

Such coarse and fine roast coffee grinds can be obtained with typical coffee grinders known in the coffee art. (For a description of various typical coffee grinders, see Sivetz and Foote, supra, pages 241–244.) Mixing the above two roast coffee grinding fractions in a 1:1 ratio gives a roast and ground coffee product having the following particle size distribution which can be characterized as a "Regular" grind.

| Resulting product: | Percent |
|---|---|
| On 12 | 0–7 |
| On 16 | 22–25 |
| On 20 | 29–35 |
| On 30 | 21–25 |
| On Pan | 13–17 |

The same result, of course, can be obtained in a multitude of other ways by varying the particle size distribution of the above coarse and fine roast coffee grind fractions, and mixing the resulting fractions in appropriate ratios.

The roast and ground coffee product of this invention is comprised of coffee particles having a size of from about 100 to about 3000 microns and preferably from about 200 to about 2000 microns. [U.S. Standard Screens can be related to particle size. See, Perry, Chemical Engineers Handbook, 3rd Ed., page 963 (1950).]

No commercial process for grinding roast coffee beans reduces coffee beans to a uniform particle size, rather than a range of particle sizes is produced. One method of characterizing a coffee grind is the method used above, i.e., by weight percent of particles retained on U.S. Standards Screens. While this method is useful for many purposes, it does not represent the preferred way of more particularly distinguishing fractions of roast coffee beans ground to a coarse particle size and fractions of roast coffee beans ground to a fine particle size for the purpose of this invention.

A more convenient method of characterizing a grind for this purpose is in terms of the weight percent of the grind having particles larger than a certain particle size. The particular particle size necessary to encompass a particular weight percent of particles having a larger particle size is designated herein as "particle oversize." Thus, for illustration, in a coffee grind having 25 weight percent of its particles larger than 1500 microns, 50 weight percent of its particles larger than 1000 microns, 75 weight percent of its particles larger than 500 microns, and 100 weight percent of its particles larger than 200 microns, the "particle oversize," for example, at 50 weight percent is 1000 microns.

The difference in the particle oversize necessary to encompass any corresponding weight percent of particles having larger particle sizes, up to 80 weight percent, for the fraction of roast coffee beans ground to a predominantly coarse particle size and the fraction of roast coffee beans ground to a predominately fine particle size is used herein to more particularly distinguish the coarse and fine fractions. (When 80 weight percent or more of the particles are larger than the particle oversize, particle oversize becomes less meaningful in distinguishing coarsely ground and finely ground fractions of roast coffee beans. This is so because as particle oversize approaches the lower limit of coffee particle size, essentially all of the particles of any fraction of the roast and ground coffee would be larger than the particle oversize.)

In order to achieve an especially meaningful taste effect, it is highly preferred in this invention that the particle oversize necessary to encompass any particular weight percent of larger particles, up to 80 weight percent, be at least 200 microns greater, most preferably at least 300 microns greater, for the fraction of roast coffee beans ground to a coarse particle size than for the fraction of roast coffee beans ground to a fine particle size.

To obtain a noticeable taste effect, the ratio of roast coffee beans ground to a fine particle size to roast coffee beans ground to a coarse particle size generally should be in the range of 1:3 to 3:1, preferably in the range of 1:2 to 2:1, as for example, a ratio of 1:1. The average particle size of the coarse and fine roast coffee grind fractions, however, will determine in part the most preferred ratio of coarse to fine particle size fractions.

As mentioned above, commercial methods of grinding roast coffee beans do not reduce coffee beans to a uniform particle size. To the extent that particle size distributions are narrowed, greater advantage can be taken of the invention. It is within the scope of this invention, for example, to narrow the particle size distribution of ground roast coffee beans by separating various sizes of roast coffee particles with sieves to obtain appropriate coarse and fine particle sizes.

Since Robusta coffee beans are generally available in large supply and reasonably priced, a preferred embodiment of this invention is a process for obtaining a roast and ground coffee product wherein the fraction of roast and ground coffee beans ground to a coarse particle size contains at least 10% Robustas, by weight of the roast and ground coffee product, and the fraction of roast and ground coffee beans ground to a fine particle size contains less than 10% Robustas, by weight of the roast and ground coffee product.

The following example is given to illustrate several preferred embodiments of the invention disclosed herein. This example is not intended to be a limitation upon the invention, as variations thereof will be fully obvious to those skilled in the art. Unless stated to the contrary all percentages and ratios mentioned herein are on a weight basis.

EXAMPLE I

Roast and ground coffee products comprised of the following blends of roast coffee beans were formed.

| Coffee bean variety | Percent | |
|---|---|---|
| | Blend I | Blend II |
| Armenia (washed) | 3.5 | 3 |
| Meseta (washed) | 11.2 | 10 |
| Prime Guatemala (washed) | 24.7 | 22 |
| Djimmah (natural) | 3.5 | 3 |
| Good El Salvador (washed) | 24.7 | 22 |
| Santos (natural) | 11.2 | 10 |
| Minas (natural) | 11.2 | 10 |
| Good African Robustas (natural) | 8.5 | 17 |
| Good Indonesian Robustas (natural) | 1.5 | 3 |

Botanically the Armenia, Meseta, Prime Guatemala, Djimmah, Good El Salvador, Santos, and Minas coffee beans in the above blends are Arabicas; the remaining coffee beans are Robustas. (The terms "washed" and "natural" refer to methods for finishing, i.e., hulling and drying, green coffee beans after harvesting. Fnishing by washing generally gives better quality green coffee bean. Sievetz and Foote, supra, Chapter 3, page 48, gives a full description of "washed" and "natural" coffee beans.)

All of the above coffee beans were separately roasted to a roast color of 70±2 p.v.

It will be noted that Blend I differs from Blend II in that Robusta beans comprise 10% of Blend I, whereas Robusta beans comprise 20% of Blend II. In addition, Blend II contains approximately 10% fewer Arabica beans than Blend I.

Part I.—Control

An ordinary "Regular" ground roast and ground coffee product not within the scope of this invention comprising a blend of the above roast coffee beans corresponding to Blend I was prepared in the following manner to serve as a control:

One portion of the roast coffee bean varieties comprising Blend I were ground to a predominately coarse particle size, and another portion of the roast coffee bean varieties comprising Blend I were ground to a predominately fine particle size. The coarsely ground fraction and the finely ground fraction had the following particle size distribution on U.S. Standard Screens.

| | On 12 | On 16 | On 20 | On 30 | On Pan |
|---|---|---|---|---|---|
| Coarse fraction, percent | 8 | 49 | 26 | 9 | 8 |
| Fine fraction, percent | 0 | 1 | 38 | 39 | 22 |

An analysis of the coarse and fine fractions indicated the following particle oversize for various weight fractions of larger particles:

PARTICLE OVERSIZE ANALYSES

| Weight percent of particles having a larger particle size | Particle oversize (microns) | | Amount article oversize for coarse fraction exceeds particle oversize for fine fraction (microns) |
|---|---|---|---|
| | Coarse fraction | Fine fraction | |
| 10 | 1,640 | 1,080 | 560 |
| 20 | 1,500 | 970 | 530 |
| 30 | 1,400 | 900 | 500 |
| 40 | 1,320 | 840 | 480 |
| 50 | 1,240 | 770 | 470 |
| 60 | 1,160 | 710 | 450 |
| 70 | 1,040 | 650 | 390 |
| 80 | 980 | 560 | 370 |

NOTE.—No coffee particles were smaller than 100 microns, or larger than 3,000 microns.

Equal parts of the resulting coarse and fine fractions were mixed together giving a roast and ground coffee product having the following particle size distribution.

Resulting product (Blend I): Percent
On 12 _____ 4
On 16 _____ 25
On 20 _____ 32
On 30 _____ 24
On Pan _____ 15

The resulting roast and ground coffee product has a particle size distribution that can be characterized as a "Regular" grind. The product is not within the scope of this invention in that no particular coffee bean variety in the product appears in a predominately coarse or fine particle size. (Typically roast and ground coffee products are obtained simply by grinding a blend of roast coffee beans, and in such products no particular coffee bean variety appears in a predominately different particle size. The elaborate procedure followed above to obtain an ordinary roast and ground coffee product was followed so that the particle distribution of the resulting product could be tightly controlled, and would be the comparable throughout the example.)

In the same fashion as above there was also obtained for control an ordinary "Regular" grind roast and ground coffee product comprising a blend of the above roast coffee beans corresponding to Blend II. This roast and ground coffee product had the same resulting particle size distribution as the above roast and ground coffee product.

Resulting Product (Blend II): Percent
On 12 _____ 4
On 16 _____ 25
On 20 _____ 32
On 30 _____ 24
On Pan _____ 15

No particular coffee bean variety in this product had a predominately different particle size.

A panel of experienced coffee tasters judged coffee brews prepared from each of these roast and ground coffee products, and found that the taste of the coffee brews differed considerably. In particular, coffee brews prepared from the Blend II roast and ground coffee product was judged to have unacceptably strong Robusta flavor notes.

Part 2.—Invention

A "Regular" grind roast and ground coffee product comprising a blend of the above roast coffee beans corresponding to Blend II was prepared according to this invention in the following manner.

The following roast coffee beans which provided a taste contribution that it was desired to decrease were ground to a predominately coarse particle size,

| Coffee Bean Variety: | Parts by wt. |
|---|---|
| Good El Salvador | 14 |
| Santos | 8 |
| Minas | 8 |
| Good African Robusta | 17 |
| Good Indonesian Robusta | 3 |
| | 50 |

The following roast coffee beans which provided a taste contribution that it was desired to increase were ground to a predominately fine particle size.

| Coffee Bean Variety: | Parts by wt. |
|---|---|
| Armenia | 3 |
| Meseta | 10 |
| Prime Guatemala | 22 |
| Djimmah | 3 |
| Good El Salvador | 8 |
| Santos | 2 |
| Minas | 2 |
| | 50 |

The coarsely ground fraction and the finely ground fraction had the following particle size distribution on U.S. Standard Screens.

| | On 12 | On 16 | On 20 | On 30 | On Pan |
|---|---|---|---|---|---|
| Coarse fraction, percent | 8 | 49 | 26 | 9 | 8 |
| Fine fraction, percent | 0 | 1 | 38 | 39 | 22 |

An analysis of the coarse and fine fractions indicated the following particle oversize for various weight fractions of larger particles:

| Weight percent of particles having a larger particle size | Particle oversize (microns) | | Amount article oversize for coarse fraction exceeds particle oversize for fine fraction (microns) |
|---|---|---|---|
| | Coarse fraction | Fine fraction | |
| 10 | 1,640 | 1,080 | 560 |
| 20 | 1,500 | 970 | 530 |
| 30 | 1,400 | 900 | 500 |
| 40 | 1,320 | 840 | 480 |
| 50 | 1,240 | 770 | 470 |
| 60 | 1,160 | 710 | 450 |
| 70 | 1,040 | 650 | 390 |
| 80 | 980 | 560 | 370 |

NOTE.—No coffee particles were smaller than 100 microns, or larger than 3,000 microns.

Equal parts of the resulting coarse and fine fractions were mixed together giving a roast and ground coffee product having the following particle size distribution.

| Resulting product (Blend II): | Percent |
|---|---|
| On 12 | 4 |
| On 16 | 25 |
| On 20 | 32 |
| On 30 | 24 |
| On Pan | 15 |

The resulting product comprised a blend of coffee beans corresponding to Blend II. This product was within the scope of the invention in that particular coffee bean varieties in the product were ground to predominately different particle sizes. A panel of experienced coffee tasters found that coffee brews prepared from this product had a remarkably different and better taste than the above-mentioned Blend II control roast and ground coffee product in that the Robusta flavor notes were not objectionably strong.

The panel then compared coffee brews prepared from the above mentioned Blend I control roast and ground coffee product, and the Blend II roast and ground coffee product prepared according to this invention, and found that the taste of the coffee brews were essentially the same. In effect, therefore, separate grinding of the various coffee taste types in accordance with the invention permitted a substitution of Robustas for Arabicas in Blend I without affecting the taste characteristics of coffee brews prepared therefrom.

EXAMPLE II

A roast and ground coffee product within the scope of this invention can be prepared in the following manner:

A blend of roast coffee beans which provides a taste contribution to a coffee brew that it is desired to decrease is ground to a predominately coarse particle size, and a different blend of roast coffee beans which provides a taste contribution to a coffee brew that it is desired to increase is ground to a predominately fine particle size, such that the coarsely ground fraction and the finely ground fraction have the following particle size distributions on U.S. Standard Screens:

| | On 12 | On 16 | On 20 | On 30 | On Pan |
|---|---|---|---|---|---|
| Coarse fraction, percent | 4 | 33 | 41 | 11 | 9 |
| Fine fraction, percent | 0 | 0 | 5 | 49 | 46 |

An analysis of the coarse and fine fractions indicated the following particle oversize for various weight fractions of larger particles:

| Weight percent of particles having a larger particle size | Particle oversize (microns) | | Amount article oversize for coarse fraction exceeds particle oversize for fine fraction (microns) |
|---|---|---|---|
| | Coarse fraction | Fine fraction | |
| 10 | 1,500 | 790 | 710 |
| 20 | 1,360 | 730 | 630 |
| 30 | 1,260 | 680 | 580 |
| 40 | 1,220 | 640 | 580 |
| 50 | 1,100 | 610 | 490 |
| 60 | 1,020 | 590 | 460 |
| 70 | 940 | 530 | 410 |
| 80 | 840 | 420 | 360 |

NOTE.—No coffee particles are smaller than 190 microns, or larger than 3000 microns.

Sixty parts of the roast coffee beans ground to a coarse particle size are mixed with 40 parts of the roast coffee beans ground to a fine particle size to give a roast and ground coffee product. The resultant product has a desired flavor and the following particle size distribution on U.S. Standard Screens.

| Resultant product: | Percent |
|---|---|
| On 12 | 3.6 |
| On 16 | 19.8 |
| On 20 | 26.6 |
| On 30 | 26.2 |
| On Pan | 23.8 |

While not wishing to be bound by any particular theory of the nature of the surprising improvement presented herein, applicant suggests that perhaps the change in coffee brew characteristics experienced in the prior art on grinding coffee beans to a fine particle size is minimized in the practice of the present invention in that the invention contemplates a mixture of coffee beans ground to a fine particle size, and coffee beans ground to a coarse particle size. Possibly the result of this practice is that while the yield of colloidal substances from coffee brews ground to a fine particle size is increased, the yield of such substances from coffee beans ground to a coarse particle size is decreased, such that the taste contribution of such colloidal substance is minimized.

What is claimed is:

1. A process for obtaining a roast and ground coffee product comprising:
    (1) separately grinding to a predominantly fine particle size a fraction containing a first blend of roast coffee beans that provide a taste contribution that it is desired to increase,
    (2) separately grinding to a predominantly coarse particle size a different fraction containing a second blend of roast coffee beans that provide a taste contribution that it is desired to decrease, and (3) mixing the resulting roast and ground coffee fractions to obtain a roast and ground coffee product; the ratio of fine particle size to coarse particle size being within the range of 1:3 to 3:1.

2. The process of claim 1 wherein the fraction of roast coffee beans ground to a coarse particle size is ground to a predominantly coarse particle size having a particle oversize at least 200 microns greater than the fraction of roast coffee beans ground to a fine particle size at any corresponding weight percent of particles having larger particle sizes, up to 80 weight percent and wherein the ratio of fine particle size to coarse particle size is within the range of from 1:2 to 2:1.

3. The process of claim 2 wherein less than 10% of the roast coffee beans ground to a predominantly fine particle size are Robusta coffee beans, by weight of the roast and ground coffee product, and at least 10% of the roast coffee beans ground to a predominantly coarse particle size are Robusta coffee beans, by weight of the roast and ground coffee product.

References Cited

UNITED STATES PATENTS

Re. 14,520  9/1918  King _____ 99—65

OTHER REFERENCES

Sivetz, Coffee Processing Tech., vol. 1, pp. 173, 202.

FRANK W. LUTTER, Primary Examiner

R. HALPER, Assistant Examiner